United States Patent [19]

Doughty

[11] Patent Number: 4,582,956
[45] Date of Patent: Apr. 15, 1986

[54] METHOD AND APPARATUS FOR DISPLAYING AT A SELECTED STATION SPECIAL SERVICE INFORMATION DURING A SILENT INTERVAL BETWEEN RINGING

[75] Inventor: Carolyn A. Doughty, Wheaton, Ill.

[73] Assignee: AT&T Bell Laboratories, Murray Hill, N.J.

[21] Appl. No.: 513,080

[22] Filed: Jul. 12, 1983

[51] Int. Cl.⁴ .................. H04M 11/00; H04M 15/06
[52] U.S. Cl. .................................. 179/2 A; 179/5.5; 179/18 B
[58] Field of Search ............... 179/2 R, 2 A, 2 AM, 179/2 AS, 2 DP, 5.5, 5 R, 5 P, 6.16, 18 B, 18 FH, 18 HB, 18 BF, 18 BG, 84 R, 84 A, 84 C, 84 SS, 99 P

[56] References Cited

U.S. PATENT DOCUMENTS

| | | | |
|---|---|---|---|
| 3,591,722 | 7/1971 | Palsa | 179/2 DP |
| 3,727,003 | 4/1983 | Paraskevakos | 178/28 |
| 3,868,640 | 2/1975 | Binnie et al. | 179/2 AM |
| 4,140,882 | 2/1979 | Regan et al. | 179/84 L |
| 4,242,539 | 12/1980 | Hashimoto | 179/5.5 |
| 4,289,931 | 9/1981 | Baker | 179/18 FH |
| 4,383,138 | 5/1983 | Castro et al. | 179/2 A X |

FOREIGN PATENT DOCUMENTS

| | | |
|---|---|---|
| 0082512 | 12/1982 | European Pat. Off. . |
| 2720435 | 5/1977 | Fed. Rep. of Germany . |
| 3025462 | 4/1980 | Fed. Rep. of Germany . |
| 2183442 | 12/1973 | France . |

Primary Examiner—Gene Z. Rubinson
Assistant Examiner—W. J. Brady
Attorney, Agent, or Firm—Richard J. Godlewski

[57] ABSTRACT

Method and apparatus is disclosed for displaying special service information at a selected station during a silent interval between ringing. The apparatus, a data receiver (100), is connected to the tip and ring leads of any well-known station set and comprises a line interface unit (101), a converter (102), a control circuit (103), and a display unit (126). A frequency shift keyed (FSK) signal which represents the special service information is filtered from the ringing signals by the line interface unit. The converter detects the FSK signal and demodulates the special service information from the FSK signal. Upon detection of the FSK signal, the control circuit receives and stores the special service information. The stored special service information is then periodically sent to the display unit to begin exhibiting the information during the silent interval before the next ringing signal.

14 Claims, 11 Drawing Figures

MESSAGE STATUS BLOCK

FIG. 5

INPUT INTERRUPT ROUTINES

FIG. 9  RECEIVE CHARACTER COUNT SUBROUTINE

FIG. 8  RECEIVE MESSAGE TYPE SUBROUTINE

METHOD AND APPARATUS FOR DISPLAYING AT A SELECTED STATION SPECIAL SERVICE INFORMATION DURING A SILENT INTERVAL BETWEEN RINGING

CROSS-REFERENCE TO RELATED APPLICATIONS

This application is related to the applications of R. W. Foster et al., Ser. No. 512956, entitled "Method and Apparatus for Providing Call Tracing Service"; R. M. Lottes, Ser. No. 512079, entitled "Method and Apparatus for Providing a Plurality of Special Services"; and C. A. Doughty, Ser. No. 512955, entitled "Method and Apparatus for Sending a Data Message to a Selected Station during a Silent Interval between Ringing"; all filed concurrently on July 12, 1983, with this application.

TECHNICAL FIELD

This invention relates to telephone station sets and particularly to displaying special service information at an on-hook telephone station.

BACKGROUND OF THE INVENTION

A variety of display station sets and other means exist for displaying at a called station the directory number of a calling station after the parties establish a talking condition between the stations. In one arrangement, while a called party is talking, the telephone switching system performs calling station directory number identification upon request of the called party. There are also some subscriber-owned systems in which the directory number of the calling station is transmitted to the called station by devices positioned at both of the stations. However, these devices are only functional after the call has assumed a talking condition.

In situations where the privacy of the called party is important, a number of arrangements are available. Many require the use of an additional communications link which is an inefficient use unless justified by other needs. Another arrangement transmits the directory number of the calling station to the called station between successive ringing signals. However, this arrangement displays only dialed information such as the directory number of a calling station and is not so practical for other than use in a private branch exchange.

SUMMARY OF THE INVENTION

The foregoing problems are solved and a technical advance is achieved by method and apparatus for displaying at a selected station special service information during a silent interval between ringing signals from a telephone switching office. In addition to transmitting the ringing signals, the telephone switching office is capable of sending to the selected station an unmodulated signal and by a modulated signal during the silent interval between ringing signals. The modulated signal represents the special service information. The apparatus includes a detector which detects the unmodulated signal during the silent interval between ringing signals. After the unmodulated signal is detected, the special service information is received and stored during the silent interval. The stored special service information is then displayed at the selected station during the silent interval.

In one illustrative embodiment of the invention, the apparatus comprises a frequency shift keyed (FSK) demodulator, a universal asynchronous receiver transmitter (UART), a microprocessor with program and data memory, and a display unit which are all well-known devices. The FSK demodulator detects incoming modulated and unmodulated carrier signals which have been filtered from the ringing signals. Upon detecting an unmodulated carrier signal, the FSK demodulator signals the UART to receive special service information demodulated from the subsequently received modulated carrier signal. Each received character of the special service information is then stored in the data memory by the program-controlled microprocessor. The stored special service information is then exhibited in the display unit under the control of the microprocessor. The display is thus initiated during the silent interval and remains until cleared. This special service information not only includes the directory number of the calling station, but may comprise special service indicators, personal messages, time of day, a called station directory number, and any other desired information.

BRIEF DESCRIPTION OF THE DRAWING

The invention may be better understood from the following detailed description when read with reference to the drawing in which.

DETAILED DESCRIPTION

Figure 1:
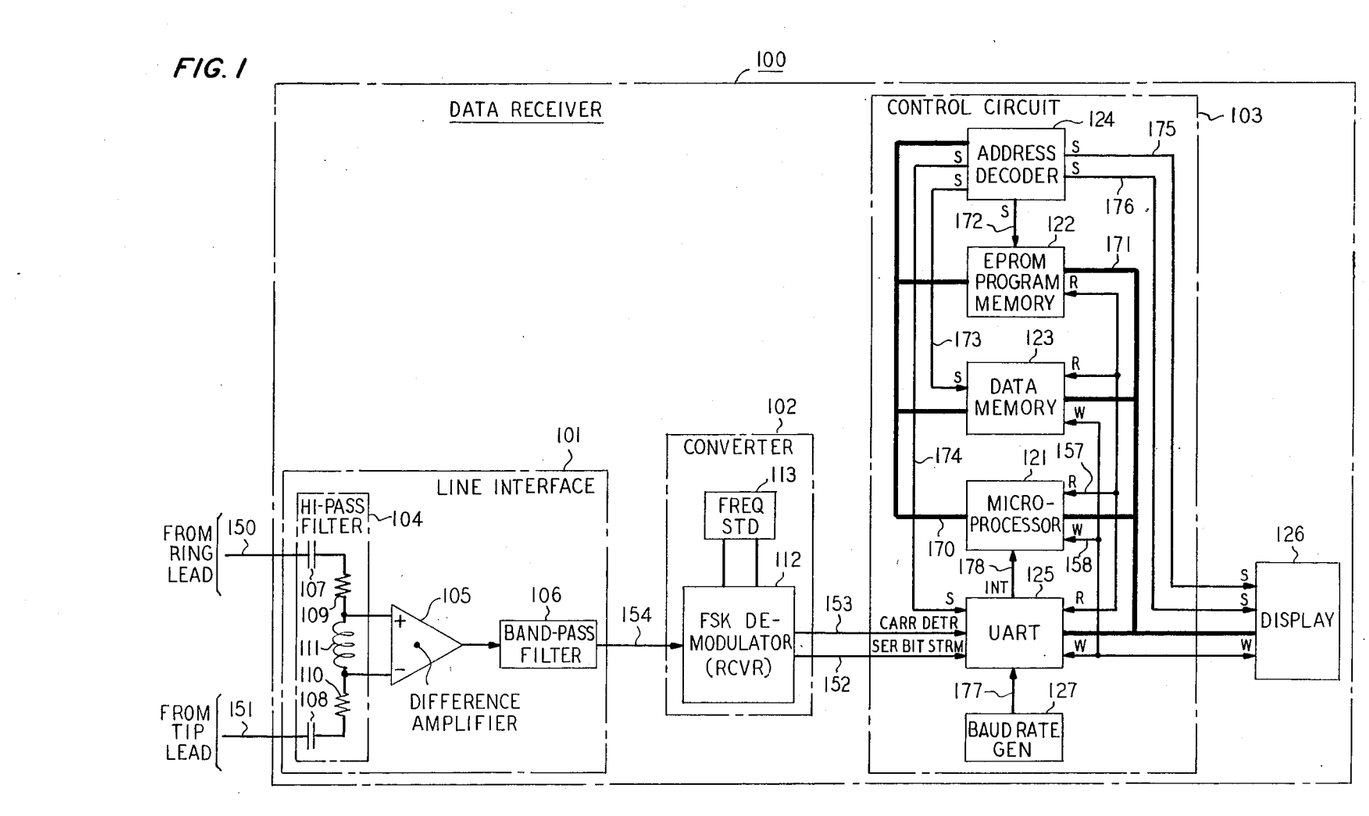
FIG. 1 shows, in block diagram form, a data receiver connectable to a telephone station set for displaying special service information during the silent interval between ringing signals from a telephone switching system.

The general organization of an embodiment of the invention is illustrated in the block diagram of FIG. 1 which shows on-hook data receiver 100. Input leads 150 and 151 of the receiver are connected to the tip and ring leads of any well-known and commercially available telephone station set. The data receiver may be built into the station set or connected to the station set as a separate stand-alone unit. Data receiver 100 comprises line interface 101, converter 102, control circuit 103, and alpha-numeric display unit 126 to receive frequency shift keyed signals during a silent interval between intermittent ringing signals from a telephone central office. These frequency shift keyed signals represent a data message which contains information which is displayed in providing a telephone special service. In particular, this special service information may include the directory number of the station which is making the call to this particular station. Also included in this information may be special service indicators, alpha-numeric messages, etc.

Figure 2:
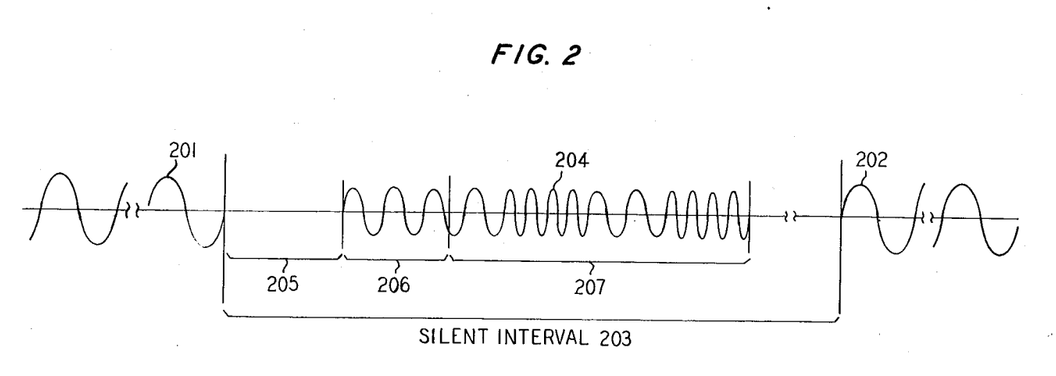
FIG. 2 illustrates an idealized frequency shift keyed signal, which represents special service information, during the silent interval between idealized ringing signals from a telephone switching system.

Graphically depicted in FIG. 2 are idealized intermittent ringing signals 201 and 202, plotted with respect to time, with silent interval 203 therebetween. Commonly transmitted from a telephone central office on the ring lead of the station set, ringing signals such as 201 and 202 typically comprise a 20-hertz, 86-volt RMS sine-wave superimposed on −48 volts. Each ringing signal occurs for a time period of approximately two seconds followed by a silent interval such as 203 of approximately four seconds in duration. With a 20-hertz ringing signal, the time period of each ringing signal cycle is 50 milliseconds.

In accordance with this invention, a serial data message is sent during the first silent interval between intermittent ringing signals. A frequency shift keyed (FSK) signal such as 204 represents this data message and comprises two carrier frequencies sucn as 2025 and 2225 hertz which represent the low ("0") and high ("1") logic levels of the serial data message. The frequency shift keyed signal is received in a balanced manner on the tip and ring leads of the station set. This signal is transmitted from the central office by a data transmitter such as described in the copending application of this inventor, C. A. Doughty, Ser. No. 512955, filed concurrently on July 12, 1983, with this application, and entitled "Method and Apparatus for Sending a Data Message to a Selected Station during a Silent Interval between Ringing". Reference to this related application is made for a better understanding of the transmission of the data message during the silent interval between ringing. As shown, frequency shift keyed signal 204 is received a short time interval such as 205 after ringing signal 201. This short time interval lasts, for example, 300 to 350 milliseconds to allow the station set to reach a steady state condition. During time interval 206, a single frequency unmodulated FSK signal is received on the tip and ring leads of the station set to initialize the data receiver. During subsequent time interval 207, a modulated FSK signal is received which represents the serial data message.

As shown in FIG. 1, line interface unit 101 comprises high-pass filter 104, difference amplifier 105 and band-pass filter 106, which amplifies the modulated and unmodulated FSK signal and attenuates the 20-hertz ringing signals. High-pass filter 104 comprises blocking capacitors 107 and 108 which are serially connected to respective input leads 150 and 151 to block any DC voltage on the tip and ring leads of the station set. Also included are resistors 109 and 110 along with inductor 111 to attenuate any 20-hertz ringing signal which may be applied to difference amplifier 105. Since the voltage level of the frequency shift keyed signal on the tip lead is equal in magnitude and opposite in polarity to the voltage level on the ring lead, difference amplifier 105 combines the two balanced input voltages to provide a single voltage input signal to band-pass filter 106. Band-pass filter 106 passes the two carrier frequencies of the frequency shift keyed signal and greatly attenuates any other signals outside the frequency range of the two FSK signal frequencies.

Converter 102 converts the modulated FSK signal from the interface unit to a serial bit stream representative of the data message. In addition, converter 102 generates a carrier detect control signal indicating when a FSK signal is present. Converter 102 comprises well-known and commercially available frequency shift keyed modem 112 connected to a frequency standard such as crystal 113. Only the demodulator portion of the modem is used to convert the modulated FSK signal to a serial bit stream. In addition, the modem generates the carrier detect control signal when a FSK signal is present.

Figure 3:
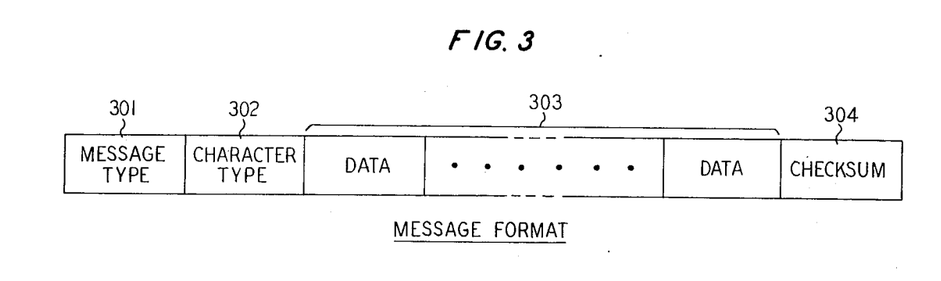
FIG. 3 discloses the message character format of the special service information sent from a telephone switching system, to the data receiver.

The serial bit stream on output conductor 152 of converter 102 comprises a plurality of serial 8-bit characters each preceded by a start bit and followed by a stop bit. Depicted in FIG. 3 is the layout of a typical data message which comprises a plurality of 8-bit characters. The first 8-bit character 301 represents the message type such as a calling station directory number, an alpha-numeric message, special service indication, etc. The second character, character count 302 represents the number of subsequent data characters contained in the message followed by check sum 304. Next, data characters 303 represent, for example, the digits of the calling station directory number, an alpha-numeric message, or any other indication which is intended to be displayed. When the data represents a directory number, each character represents two digits of the number beginning with the highest order digit of the number. Each digit is thus encoded as a 4-bit binary coded decimal character. The last character of the message, check sum character 304, is the two's complement of the modulo 256 total of the character bytes of the message. Thus, when all the characters of the message are totaled, the sum should be zero if the message was received correctly.

The carrier detect control signal present on output conductor 153 of converter 102 assumes one of two logic levels when a FSK signal is present on input conductor 154 and assumes the other logic level when an FSK signal is not present.

Shown in FIG. 1, control circuit 103 is the processing unit of on-hook data receiver 100. Control circuit 103 performs two basic operations; namely, it interprets data messages received from converter 102 and sends special service information to alpha-numeric display 126. Control circuit 103 comprises microprocessor 121, program memory 122, data memory 123, address decoder 124, UART 125, and baud rate generator 127 which are all well-known and commercially available units. Also included are address bus 170 and data bus 171 which interconnect the various units as shown. Common to the various units of the control circuit are read (R) and write (W) conductors 157 and 158 for conveying read and write signals from microprocessor 121 to the other units of the control circuit. Individual select (S) conductors 172 through 176 from address decoder 124 are used to access program memory 122, data memory 123, UART 125, and display 126, respectively, in a well-known manner.

Microprocessor 121 is the information processing unit of the control circuit and executes the program instructions stored in program memory 121 to periodically update display 126. Furthermore, responsive to the carrier detect control signal from converter 102, microprocessor loads the characters of the data message into data memory 123.

Program memory 122 is a permanent memory such as an erasable programmable read-only memory (EPROM) and stores program instructions which direct microprocessor 121 to sequentially perform its many functions.

Figure 4:
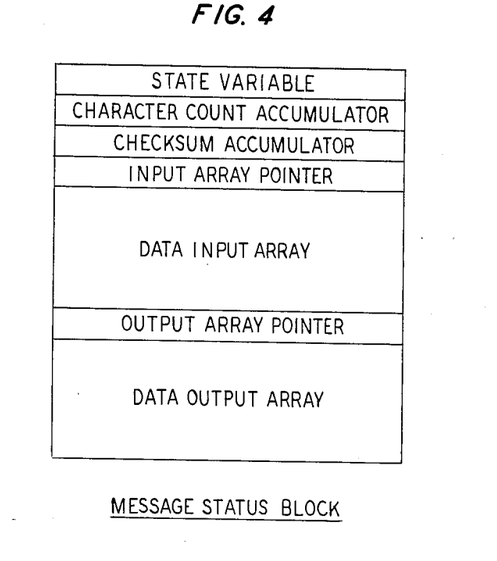
FIG. 4 shows the memory layout of a message status block in the data memory of the data receiver.

Data memory 123 is a temporary and erasable memory such as a random access memory for storing information related to the incoming message. The data memory comprises a message status block which is segmented to store a plurality of variables necessary to receive a data message. Depicted in FIG. 4 is the layout of the message status block (MSB) of the data memory which is segmented into a plurality of variables such as a MSB state, character count accumulator, check sum accumulator, input array pointer, and an output array pointer. Also included are larger segments of memory for an input and an output data array.

Universal asynchronous receiver transmitter (UART) 125 interfaces with microprocessor 121 to receive the serial data messages from converter 102. These serial data messages are converted by UART 125 to a parallel format which are interpreted by microprocessor 121. As previously mentioned, these serial format data messages include special service information such as the directory number of a calling station.

Responsive to address signals received on address bus 170 from microprocessor 121, address decoder 124 selects program memory 122, data memory 123, UART 125, and display 126 to receive address signals on address bus 170 and data signals on data bus 171.

Baud rate generator 127 generates bit rate timing signals for UART 125. For example, this timing signal has a bit rate of 16×300 baud which represents the baud rate of the incoming data message to UART 125. Responsive to this timing signal on conductor 177, UART 125 receives serial data characters on conductor 152. Furthermore, UART 125 generates an interrupt signal to microprocessor 121 via conductor 178 when the carrier detect control signal on conductor 153 changes level or when a complete data character has been received.

Display unit 126 is a well-known and commercially available array of light-emitting diodes (LED's) or the like for displaying special service information from control circuit 103. As suggested, this special service information may be the directory number of a calling station. Microprocessor 121 periodically updates each character of the display by selecting one of two well-known registers, a character address register and a data register of the unit (not shown), and writing data into these registers via data bus 171. Selecting the character address register via select (S) conductor 175, microprocessor 121 writes the address of the display character into the character address register via data bus 171 by activating write (W) conductor 158. The contents of this register is then used to address the desired character in the display. In addition, selecting the data register via select (S) conductor 176, microprocessor 121 writes the data register with the character for the desired display character location. Thus, each character of the display is periodically addressed to form a continuous display of the data message.

As previously mentioned, control circuit 103 performs two basic functions. The first is to interpret and store the data received in the receive buffer register of the UART, and the second is to periodically update the characters of the display with the stored data. These actions are accomplished by program instructions stored in the program memory which direct the microprocessor to perform the following functions: (1) recognize a start of message, (2) buffer data into data memory 123, (3) check character count and check sum, (4) recognize loss of carrier, (5) recognize an excessive intercharacter timing interval, (6) discard defective messages, and (7) unpack incoming BCD digits. The first basic operation involves receiving a data message from the central office for the associated called station. This data message includes special service information such as the directory number of the calling station in addition to a special service indicator. As previously described, the receipt of a data message is preceded by typically 90-milliseconds of a single frequency unmodulated FSK signal. This single frequency FSK signal causes converter 102 to send a carrier detect control signal to UART 125. Responsive to the carrier detect control signal, UART 125 sends an interrupt signal to microprocessor 121. This in turn causes microprocessor 121 to call an input interrupt routine which is stored in program memory 122.

Figure 5:
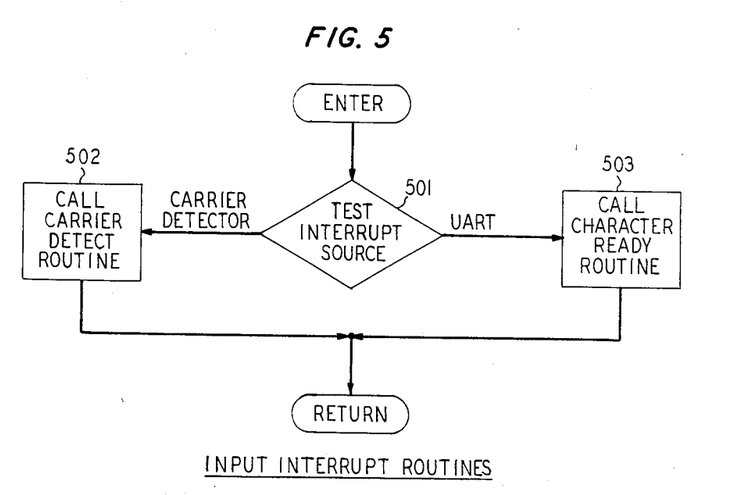
FIGS. 5 through 10 show detailed flow diagrams of the routines and subroutines for detecting and receiving special service information at a selected station during a silent interval between ringing signals.

Depicted in FIG. 5 is the INPUT INTERRUPT routine which is called in response to an interrupt signal from UART 125. The INPUT INTERRUPT routine is called in response to a plurality of events, thus making it necessary for the microprocessor to determine which event caused the interrupt. Microprocessor 121 determines the cause of the interrupt by reading a well-known status register (not shown) in the UART which contains the logic level of the carrier detect control signal. The bits of the status register are examined to determine whether the carrier detect control signal has changed logic levels or the UART receive buffer register has received a complete data character (block 501). When the carrier detect control signal has changed logic levels to indicate the presence of a frequency shift keyed signal from the central office, a CARRIER DETECT routine is called (block 502). When the status register indicates that a complete data character has been loaded in the UART receive buffer register, a CHARACTER READY routine is called (block 503). When the INPUT INTERRUPT routine is completed, control is then returned to the base level program which is used to periodically update alpha-numeric display 126.

Figure 6:
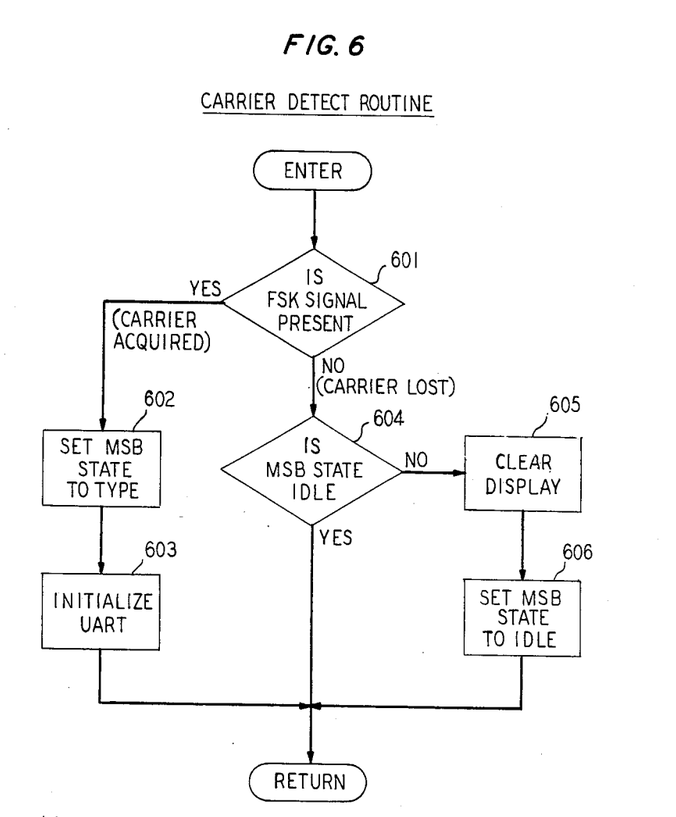

Depicted in FIG. 6 is the CARRIER DETECT routine which is used to recognize the beginning of a data message. When an unmodulated single carrier frequency FSK signal has been detected (block 601) microprocessor 121 sets the state of the message status block in data memory 123 to "type" (block 602) and initializes the UART (block 603). Microprocessor 121 initializes UART 125 by writing the status register of the UART. In response, UART 125 clears its receive buffer register in a well-known manner.

When the carrier detect control signal changes logic level to indicate the absence of a frequency shift keyed signal (block 601), the state of the message status block is checked to determine whether it is "idle" (block 604). When "idle", a complete data message has been received, as expected, and control is returned to the base level program. When the state of the message status block is not "idle", this indicates an abnormal termination of the data message transmission such as would happen when a customer lifts his receiver off hook during the transmission of a data message. As a result, the display is cleared (block 605), and the message status block is set to "idle" (block 606). Control is then returned to the INPUT INTERRUPT routine.

Figure 7:
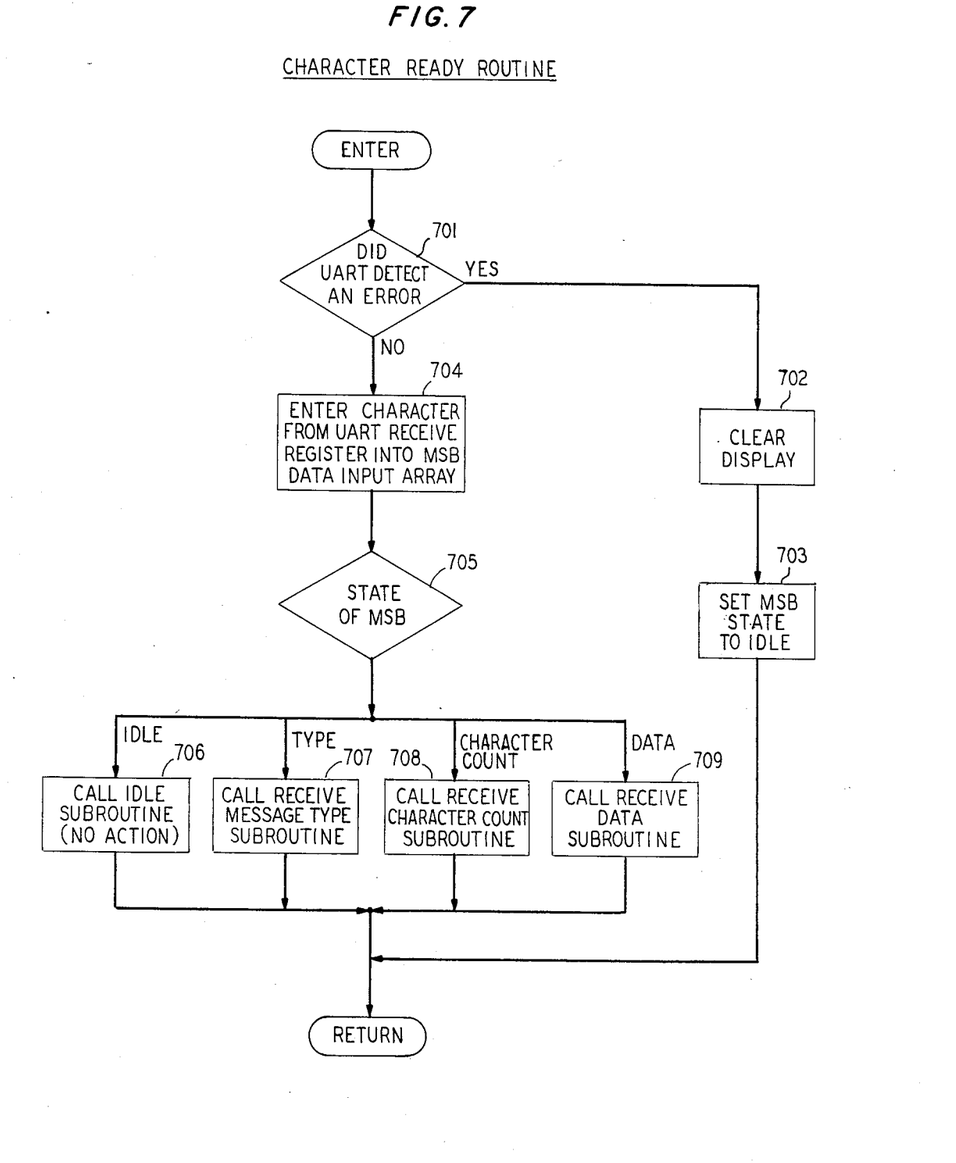

When the INPUT INTERRUPT routine indicates that a complete data character has been loaded in the UART receive buffer register, microprocessor 121 calls the CHARACTER READY routine which is depicted in FIG. 7. The status register of the UART is then examined to determine whether the interrupt signal was caused by the receipt of a complete data character or by a data transmission error. Typically, a data transmission error is the result of noise on the tip and ring leads of the station set typically causing a framing error. When the UART has detected a transmission error (block 701), display 126 is cleared (block 702), and the message status block state is set to "idle" (block 703). Control is then returned to the INPUT INTERRUPT routine.

When UART status register indicates that a complete data character has been received, microprocessor 121 reads the character in the UART receive buffer register and stores the character in the data input array of the message status block (block 704). The data input array of the message status block is a segment of data memory 123 in which are stored the characters of the data message received from the central office transmitter. Based on the state of the message status block (block 705), microprocessor 121 calls one of four subroutines: namely, IDLE (block 706), RECEIVE MESSAGE TYPE (block 707), RECEIVE CHARACTER COUNT (block 708), and RECEIVE DATA (block 709).

When the message status block is in the "idle" state, no action is required, and control is immediately returned to the CHARACTER READY routine.

Figure 8:
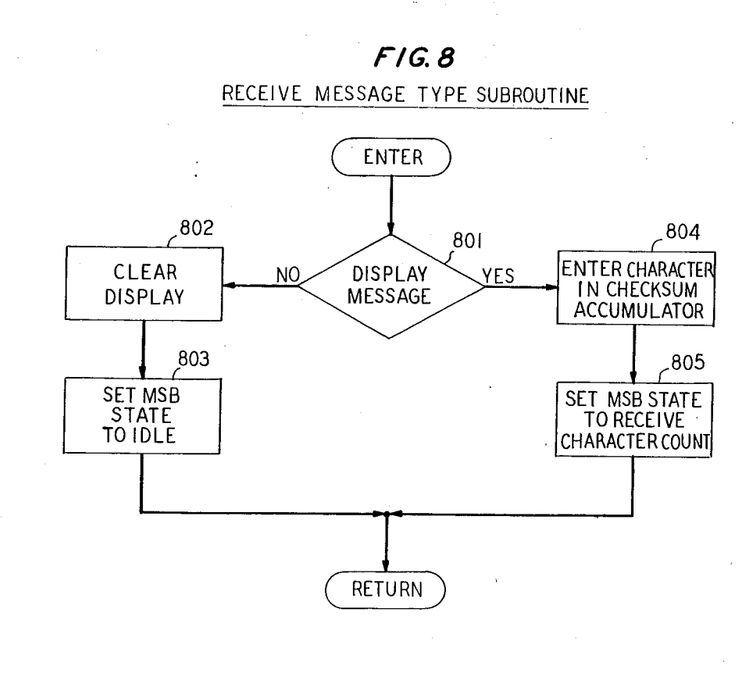

When the state of the status block is "type", the RECEIVE MESSAGE TYPE subroutine is called which is depicted in FIG. 8. Microprocessor 121 interprets the message type character to determine whether the data message is to be displayed (block 801). Recognizing that the message is not to be displayed, microprocessor 121 clears display 126 (block 802) and sets the message status block state to "idle" (block 803). Control is then returned to the CHARACTER READY routine. Recognizing that the message is to be displayed, microprocessor 121 stores the message type character in the check sum accumulator of the message status block for subsequent check sum calculations (block 804) and sets the state of the message status block to "character count" (block 805). After which, control is once again returned to the CHARACTER READY routine.

Figure 9:
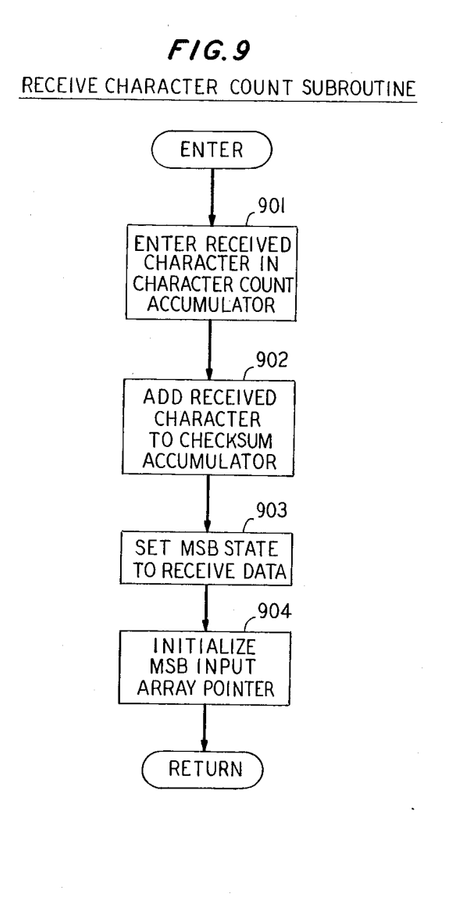

When the second character of the data message is received by the UART, microprocessor 121 calls the RECEIVE CHARACTER COUNT subroutine which is depicted in FIG. 9. Under control of this subroutine, microprocessor 121 performs several operations. First, the character is entered in the character count accumulator of the message status block to indicate the number of subsequent data characters to be received (block 901). Second, the character is added to the check sum accumulator in the message status block for transmission error detection (block 902). Next, microprocessor 121 sets the state of the message status block to "data" (block 903). Lastly, the input array pointer of the message status block is initialized for use in storing subsequently received data characters (block 904). After this, control is once again returned to the CHARACTER READY routine.

Figure 10:
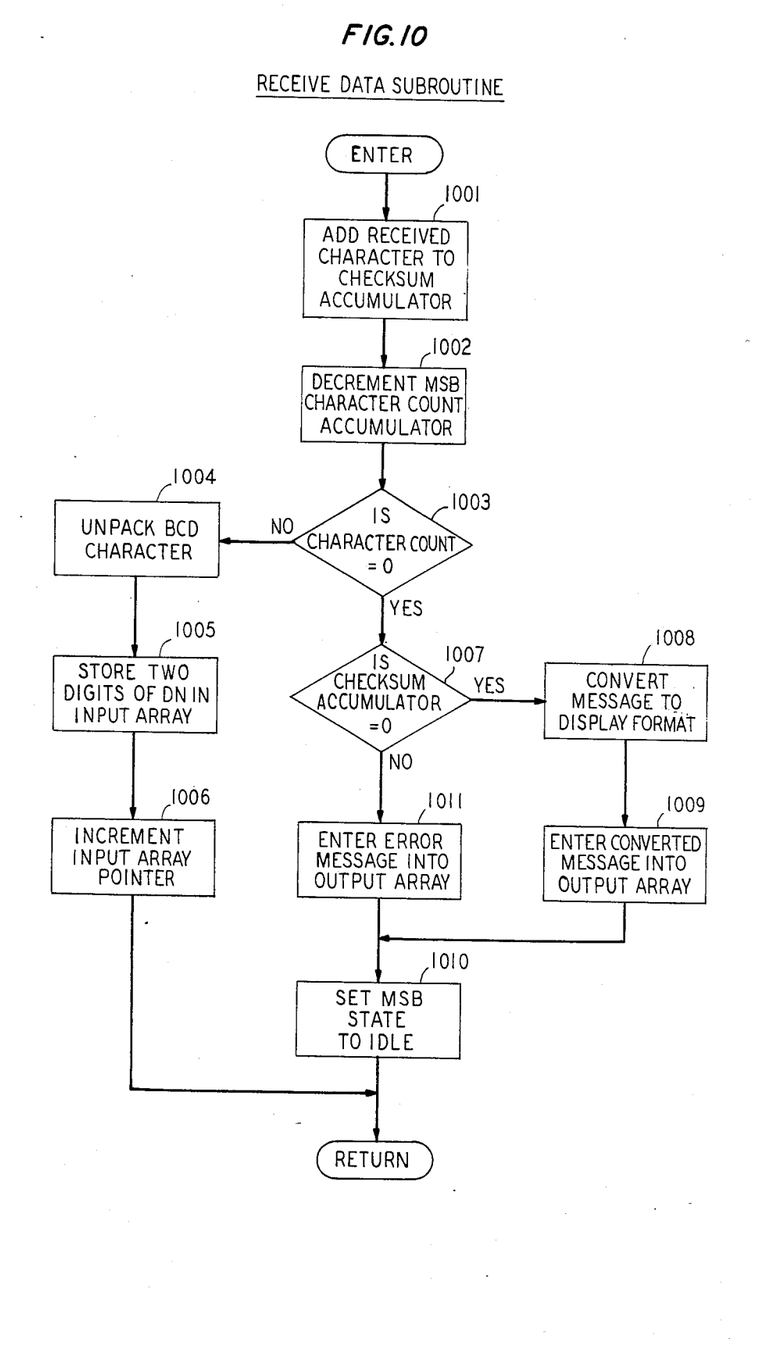

Upon receiving the third character from UART 125, microprocessor 121 calls the RECEIVE DATA subroutine which is depicted in FIG. 10. Under control of this subroutine, microprocessor 121 first adds the received character to the check sum accumulator (block 1001) and decrements the character count accumulator of the message status block (block 1002). The character count accumulator is decremented each time a data character is received to determine the end of the data message (block 1003). The end of a data message is reached when the character count equals zero with the receipt of a check sum character. Otherwise, when the end of a data message has not been reached, microprocessor 121 unpacks the binary coded decimal character to form two digits of the calling station directory number (DN) (block 1004) and stores them in the data input array of the message status block using the array pointer (block 1005). The input array pointer is then incremented to a data memory location for the subsequent storage of the next digits of the directory number (block 1006). Again, control is returned to the CHARACTER READY routine.

The RECEIVE DATA subroutine is repeatedly called by the microprocessor until all the characters of a complete data message have been stored in the data input array of the message status block. As mentioned, the subroutine is repeatedly called until the character count of the message status block equals zero (block 1003) at which time the contents of the check sum accumulator is examined (block 1007). When the contents of the check sum accumulator equals zero, microprocessor 121 converts the characters stored in the data input array to a format suitable for display (block 1008) and enters the converted format message in the output array of the message status block (block 1009). The state of the message status block is then set to "idle" (block 1010), and control is, once again, returned to the CHARACTER READY routine.

When the contents of the check sum accumulator is other than zero, this normally indicates that a character has been changed in transmission due to noise or the like. Thus, an appropriate error message is entered into the data output array (block 1011), and the state of the message status block is once again set to "idle" (block 1010) to prepare the receiver for the receipt of the next data message. Likewise, control is then returned to the CHARACTER READY routine.

Figure 11:
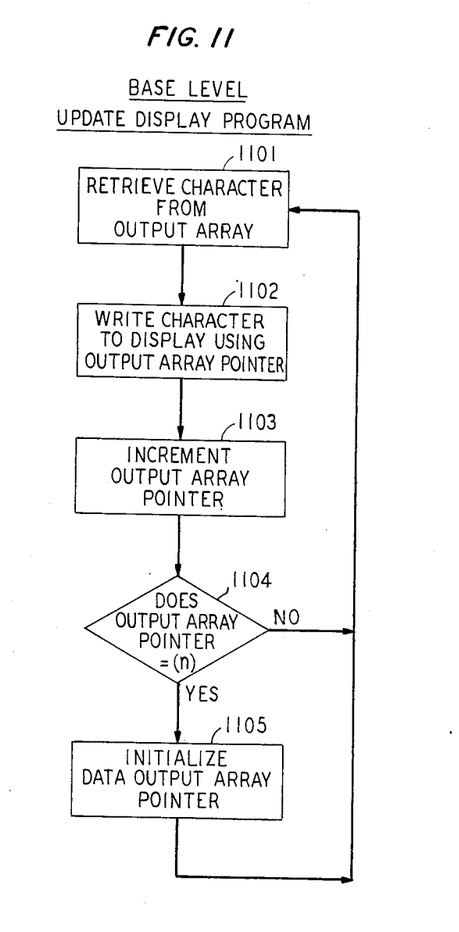
FIG. 11 shows a flow diagram of the base level program for periodically updating the display unit of the data receiver with special service information.

After having received a data message from the central office and storing it in the data output array of the message status block, microprocessor 121 under the control of a base level update display program uses the data output array to display the data message in display 126. The BASE LEVEL UPDATE-DISPLAY program is depicted in FIG. 11 and is repeatedly used by the microprocessor to update display 126 whenever none of the input interrupt routines are called. Microprocessor 121 uses the update-display program to retrieve, for example, the digits of the calling station directory number stored in the data output array of the message status block and to display the digits in the appropriate location of the display. This operation is repeated at a rate such that all the digits of the directory number "appear" to be simultaneously present in the display as is the case with any well-known pocket calculator. Microprocessor 121 accomplishes this operation by first initializing the array output pointer of the message status block to point to the first character of the data output array. Guided by the output array pointer, microprocessor 121 retrieves the first character of the data message from the data output array (block 1101). Again using the output pointer, microprocessor 121 then writes the character into the display as previously described (block 1102) and increments the output array pointer for the next character of the data message (block 1103). This operation is repeated until all the characters of the (n) character display have been addressed. This is the case when the output array pointer equals the number of characters (n) of the display (block 1104). The array output pointer is again initialized (block 1105), and the update-display process is repeated.

It to be understood that the above-described data receiver is merely an illustrative embodiment of the principles of this invention and that numerous other arrangements may be devised by those skilled in the art without departing from the spirit and scope of the invention. In particular, the data receiver may be used to display not only the directory number of a calling station during the first silent interval, but also special service indicators, personal messages and the like. Thus, this data receiver may be used with any well-known station set to provide a plurality of special services to a telephone customer.

What is claimed is:

1. A method for displaying at a selected station special service information during a silent interval between ringing signals from a telephone switching system, said system being capable of sending to said selected station a modulated and an unmodulated signal during said silent interval, said modulated signal representing said special service information; said method comprising the steps of:
    detecting said unmodulated signal during said silent interval between said ringing signals;
    responsive to the detection of said unmodulated signal, receiving said modulated signal representative of said special service information during said silent interval;
    storing said special service information during said silent interval; and
    displaying said stored special service information at said selected station during said silent interval.

2. The method as set forth in claim 1 wherein said method further comprises the step of demodulating said special service information from said modulated signal during said silent interval.

3. The method as set forth in claim 1 wherein said method further comprises the step of filtering said modulated and unmodulated signals from said ringing signals during said silent interval.

4. The method as set forth in claim 1 in which said special service information includes a message type and wherein said receiving step includes the step of receiving said modulated signal representative of said message type during said silent interval after detecting said unmodulated signal.

5. The method as set forth in claim 4 in which special services information further includes a message length and wherein said step of receiving said modulated signal representative of said special services information further includes the step of receiving said modulated signal representative of said message length to store said special service information during said silent interval.

6. The method as set forth in claim 5 in which said special services information further includes a check sum and wherein said step of receiving said modulated signal representative of said special services information further includes the step of receiving said modulated signal representative of said check sum to ascertain errors introduced in sending said special service information during said silent interval.

7. The method as set forth in claim 6 wherein said method further comprises the step of demodulating said message type, said message length, and said check sum from said modulated signal during said silent interval.

8. The method as set forth in claim 7 wherein said method further comprises the step of filtering said unmodulated and said modulated signal from said ringing signals.

9. Apparatus for displaying at a selected station special service information during a silent interval between ringing signals from a telephone switching system, said system being capable of sending to said selected station a modulated and an unmodulated signal during said silent interval, said modulated signal representing said special service information; said apparatus comprising
    detector means for detecting said unmodulated signal during said silent interval between said ringing signals;
    receiver means responsive to the detection of said unmodulated signal for receiving said modulated signal representative of said special service information during said silent interval;
    memory means for storing said special service information during said silent interval; and
    display means for displaying said stored special service information at said selected station during said silent interval.

10. The apparatus in accordance with claim 9 in which said apparatus further comprises demodulator means for demodulating said special service information from said modulated signal during said silent interval.

11. The apparatus in accordance with claim 9 in which said apparatus further comprises filter means for filtering said modulated and unmodulated signals from said ringing signals during said silent interval.

12. The apparatus in accordance with claim 9 in which said apparatus further comprises processor means responsive to a first plurality of program instructions stored in a program memory for entering said special service information from said receiver means into said memory means during said silent interval.

13. The apparatus in accordance with claim 12 in which said processor means is responsive to a second plurality of program instructions stored in said program memory for sending said stored special service information to said display means during said silent interval.

14. The apparatus in accordance with claim 13 in which said processor means is also responsive to said second plurality of program instructions for periodically sending said stored special service information to said display means during said silent interval.

* * * * *

REEXAMINATION CERTIFICATE (2393rd)

United States Patent [19]
Doughty

[11] B1 4,582,956
[45] Certificate Issued Sep. 20, 1994

[54] METHOD AND APPARATUS FOR DISPLAYING AT A SELECTED STATION SPECIAL SERVICE INFORMATION DURING A SILENT INTERVAL BETWEEN RINGING

[75] Inventor: Carolyn A. Doughty, Wheaton, Ill.

[73] Assignee: Bell Telephone Laboratories, Incorporated, Murray Hill, N.J.

Reexamination Requests:
No. 90/002,774, Jul. 9, 1992
No. 90/003,164, Aug. 16, 1993

Reexamination Certificate for:
Patent No.: 4,582,956
Issued: Apr. 15, 1986
Appl. No.: 513,080
Filed: Jul. 12, 1983

[51] Int. Cl.⁵ .................. H04M 11/00; H04M 15/06
[52] U.S. Cl. .................... 379/94; 379/96; 379/142
[58] Field of Search ............ 379/93, 94, 96–98, 379/142, 201, 207, 372, 373, 376, 90, 110

[56] References Cited

U.S. PATENT DOCUMENTS

| | | |
|---|---|---|
| 3,591,722 | 7/1971 | Palsa . |
| 3,868,640 | 2/1975 | Binnie et al. .................. 340/151 |
| 4,242,539 | 12/1980 | Hashimoto . |
| 4,289,931 | 9/1981 | Baker . |
| 4,383,138 | 5/1983 | Castro et al. . |

FOREIGN PATENT DOCUMENTS

| | | |
|---|---|---|
| 2538820 | 3/1977 | Fed. Rep. of Germany . |
| 53-24171 | 6/1978 | Japan . |

OTHER PUBLICATIONS

AT&T Practice Standard Publication (Jan. 1979).

*Primary Examiner*—Wing F. Chan

[57] ABSTRACT

Method and apparatus is disclosed for displaying special service information at a selected station during a silent interval between ringing. The apparatus, a data receiver (100), is connected to the tip and ring leads of any well-known station set and comprises a line interface unit (101), a converter (102), a control circuit (103), and a display unit (126). A frequency shift keyed (FSK) signal which represents the special service information is filtered from the ringing signals by the line interface unit. The converter detects the FSK signal and demodulates the special service information from the FSK signal. Upon detection of the FSK signal, the control circuit receives and stores the special service information. The stored special service information is then periodically sent to the display unit to begin exhibiting the information during the silent interval before the next ringing signal.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

New claims 15-19 are added and determined to be patentable.

15. A method for displaying at a selected station special service information during a silent interval between ringing signals from a telephone switching system, said system being capable of sending to said selected station a modulated and an unmodulated signal during said silent interval, said modulated signal representing said special service information; said method comprising the steps of:
    detecting said unmodulated signal after the beginning of said silent interval between said ringing signals;
    responsive to the detection of said unmodulated signal, receiving said modulated signal representive of said special service information during said silent interval;
    storing said special service information during said silent interval; and displaying said stored special service information at said selected station during said silent invertal.

16. A method for displaying at a selected station special service information received during a silent interval between ringing signals from a telephone switching system, said system being capable of sending to said selected station an input signal during said silent interval, said input signal comprising a single frequency umodulated frequency shift keyed (FSK) signal followed by a modulated FSK signal, said modulated FSK signal representing said special service information; said method comprising the steps of:
    at said selected station, within said silent interval between ringing signals, following a first period of time during which neither said unmodulated nor said modulated signal is received, detecting said single frequency unmodulated FSK signal for a second period of time within said silent interval between ringing signals, said detecting being independent of a length of said second period, said single frequency unmodulated FSK signal representing no detectable information;
    following said detecting of said single frequency unmodulated FSK signal, detecting and demodulating said modulated FSK signal to produce an indication of characters of said special service information;
    storing said indication of said special service information during said silent interval; and
    displaying said stored special service informaiton at said selected station during said silent interval.

17. The method of claim 16 wherein said first period of time is at least 300 milliseconds long.

18. Apparatus for displaying at a selected station special service information received during a silent interval between ringing signals from a telephone switching system, said system being capable of sending to said selected station an input signal during said silent interval, said input signal comprising a single frequency unmodulated frequency shift keyed (FSK) signal and a modulated FSK signal, said modulated FSK signal representing said special service information; said apparatus comprising:
    means for detecting, within said silent interval between ringing signals, following a first period of time during which neither said unmodulated nor said modulated signal is received, said single frequency unmodulated FSK signal for a second period of time within said silent interval between ringing signals, said detecting being independent of a length of said second period, said single frequency unmodulated FSK signal representing no detectable information;
    means, responsive to said means for detecting said single frequency unmodulated FSK signal, for detecting and demodulating, following said detection of said single frequency unmodulated FSK signal, said modulated FSK signal to produce an indication of characters of said special service information;
    means for storing said indication of said special service information during said silent interval; and
    means for displaying said stored special service information at said selected station during said silent interval.

19. The apparatus of claim 18 wherein said first period of time is at least 300 milliseconds long.

* * * * *